United States Patent [19]

Coffman et al.

[11] Patent Number: 5,371,460
[45] Date of Patent: Dec. 6, 1994

[54] SPEED AND DIRECTION SENSOR FOR A ROTATING SHAFT HAVING A ROTOR WITH TEETH OF ALTERNATING WIDTHS

[75] Inventors: Michael F. Coffman, Metamora; Steven W. Judy, Chillicothe, both of Ill.

[73] Assignee: Caterpillar Inc., Peoria, Ill.

[21] Appl. No.: 948,190

[22] Filed: Sep. 21, 1992

[51] Int. Cl.⁵ .................... G01P 3/44; G01P 3/487; G01B 7/30
[52] U.S. Cl. .................................... 324/165; 340/672
[58] Field of Search ............... 324/207.11, 207.12, 324/207.22, 207.25, 165, 166, 173, 174; 340/671, 672

[56] References Cited

U.S. PATENT DOCUMENTS

| | | | |
|---|---|---|---|
| 4,142,153 | 2/1979 | Smith | 324/165 |
| 4,746,862 | 5/1988 | Ueki | 324/207.25 |
| 4,972,332 | 11/1990 | Luebbering et al. | 364/565 |

*Primary Examiner*—Walter E. Snow
*Attorney, Agent, or Firm*—James R. Yee

[57] ABSTRACT

An apparatus for determining the speed and direction of a rotating shaft is provided. The apparatus includes a rotor connected to the shaft. The rotor has a plurality of teeth of alternating widths. The apparatus detects the teeth and responsibly determines the speed and direction of rotation of the shaft.

5 Claims, 4 Drawing Sheets

SPEED AND DIRECTION SENSOR FOR A ROTATING SHAFT HAVING A ROTOR WITH TEETH OF ALTERNATING WIDTHS

TECHNICAL FIELD

This invention relates generally to an apparatus for determining the speed and direction of a rotating shaft and more particularly, to an apparatus for determining the speed and direction of a rotating shaft using a rotor with alternating large and small teeth.

BACKGROUND ART

The use of electronics on vehicles, especially in the area of electronic control systems has been and will continue to increase. For example, electronic engine, transmission, and steering controllers and in the earthmoving vehicle field, electronic implement controllers all are becoming more common and more complex.

Typically, the controller is supplied with data from a number of sensors. As a result of the increasing complexity of such systems, the information or data that the sensors are required to provide also increases in complexity, for example, the amount of information conveyed, the accuracy of the data, the dependability of the data, and the speed at which it is acquired. Today's sensors typically must increase each of these parameters while minimizing overall costs.

One such sensor is used to measure the speed and direction of a rotating shaft. Such information may be required by, for example, an electronic transmission control system. Typically, in order to measure the speed of rotation, a rotor with a plurality of teeth is fixed to the shaft. The rotor rotates with the shaft. A pickup sensor is placed in a suitable position to sense the teeth as the rotor moves beneath it. By counting the teeth and measuring time, the speed of the shaft may be determined. However, measuring the direction of the shaft's rotation is more difficult.

One method for measuring the direction of a shaft's rotation is to use two pickup sensors or sensor elements. The two sensors elements are placed in a particular spatial relationship with the teeth of the rotor. By determining the relative times at which an edge is detected by each sensor element, the direction can be determined. However, this method requires additional hardware and the associated costs of the additional sensor element. In addition, this method also requires addition computational time and/or added circuit complexity in order to process the signals from the two sensor elements.

In another method for measuring the direction of a shaft's rotation is to place a distinguishing feature, e.g., an over or under sized tooth or a missing tooth on the rotor. One such system is disclosed in U.S. Pat. No. 4,972,332 issued Nov. 20, 1990 to Luebbering et al. The apparatus disclosed in Luebbering et al includes a rotor with a plurality of teeth and a distinguishing feature. The distinguishing feature includes one undersized tooth surrounded by "normal" sized teeth and two consecutive undersized teeth separated from the first undersized tooth by three normal teeth. The apparatus detects both the rising and falling edges of the teeth to determine speed and direction of the rotor. The direction of the rotor is determined by identifying the single undersized tooth. If three normal sized teeth followed by two undersized teeth are detected the shaft is rotating in one direction. If not, then the shaft is rotating in the opposite direction.

However with the apparatus in Luebbering, determination of the shaft's direction is dependent upon the detection of the single undersized tooth. That is, in order to determine the shaft's direction, the undersized tooth has to be detected first. It is desirous to provide direction information more consistently, that is, independent of the position of the rotor.

The present invention is adapted to overcome one or more of the problems as set forth above.

DISCLOSURE OF THE INVENTION

In one aspect of the present invention an apparatus for determining the speed and direction of a rotating shaft is provided. A rotor having a plurality of teeth of alternating widths is connected to the shaft. The apparatus detects the teeth and responsibly determines the speed and direction of rotation of the shaft.

BEST MODE FOR CARRYING OUT THE INVENTION

Figure 1:
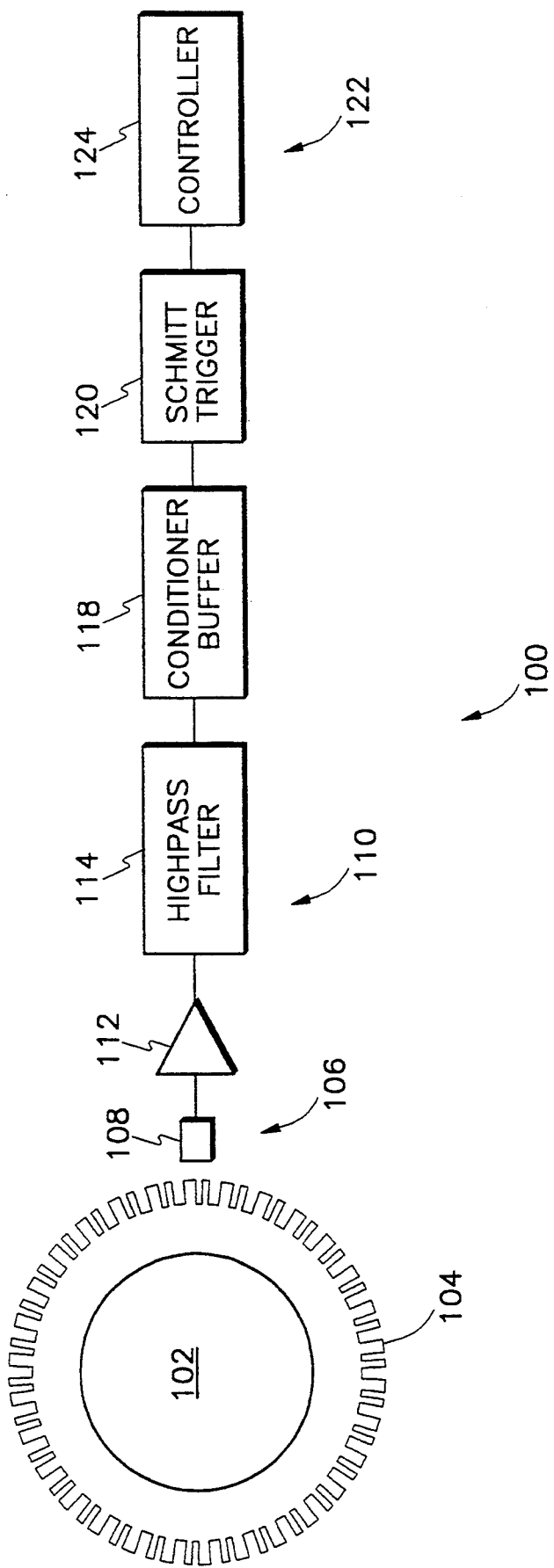
FIG. 1 is a block diagram of a speed and direction sensor for a rotating shaft having a rotor and a pickup sensor, according to an embodiment of the present invention.

With reference to FIG. 1, an apparatus 100 for determining the speed and direction of a rotating shaft 102 is provided. The apparatus 100 includes a rotor 104 fixedly attached to the shaft 102, such that the shaft 102 and the rotor 104 rotate together.

Figure 2:
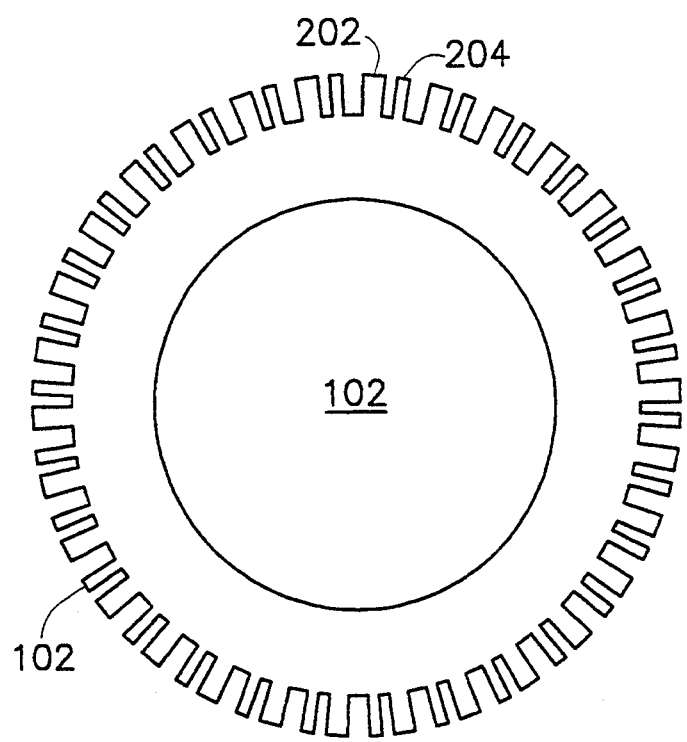
FIG. 2 is a diagrammatic view of the rotor of FIG. 1 having alternating large and small teeth, according to the preferred embodiment.

With reference to FIG. 2, in the preferred embodiment the rotor 104 has a plurality of "large" teeth 202 and a plurality of "small" teeth 204. The teeth 202,204 alternate, that is, every other tooth is a large tooth. The number and size of the teeth are dependent upon a number of factors, including: the size of the shaft and the rotor, the speed range at which the rotor turns, and the speed range the apparatus is required to detect. For example, in one embodiment, a rotor has a diameter of 117 mm and includes 20 large teeth and 20 small teeth. In another embodiment, a 145 mm diameter rotor has 30 large teeth and 30 small teeth.

In one embodiment, the rotor is manufactured by cutting the gaps from a solid rotor. In another embodiment, the gaps are not completely cut from the rotor, but rather are cut only deep enough for the sensor to detect. That is, the outer edge of the rotor remains a circle. The gaps are implemented only on one side (face) of the rotor.

Figure 3:
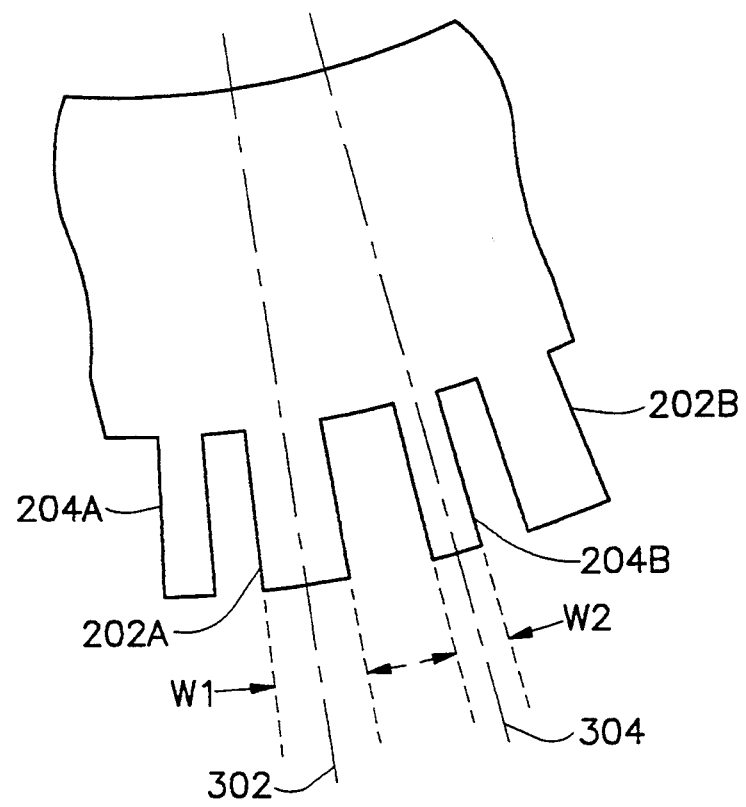
FIG. 3 is a diagrammatic view of an enlarged portion of the rotor of FIG. 2.

With reference to FIG. 3, the teeth 202,204 are separated by a large gap and a small gap. In one embodiment, to the left (clockwise) of a large tooth is a small gap and to the right (counterclockwise) of a large tooth 202 is a large gap (as shown). In another embodiment, the large and small teeth are in reverse order. Either arrangement will work as long as the spatial relationship remains the same, i.e., the teeth and the gaps are in an alternating pattern. In the preferred embodiment, the large tooth is substantially the same size as the large gap and the small tooth is substantially the same size as the small gap.

The width (W1) of a large tooth 202 is defined by a line 302 extending from the center of the rotor 104 to the center of the top of the tooth and the dotted lines perpendicular to line 302, as shown. The width (W2) of a small tooth 204 is defined by a line 304 in a similar manner. The ratio of W1 to W2 is dependent upon physical restriction (how small a tooth can be cut) in addition to the above listed design criteria. In the preferred embodiment, the ratio of W1 to W2 or R is approximately 2 and preferably 1.3/0.7. Furthermore, the large teeth are the same size as the large gaps and the small teeth are the same size as the small gaps.

Returning to FIG. 1, a means 106 detects the teeth 202,204 as the shaft 102 turns. The detecting means 106 includes a pickup sensor 108. In one embodiment, the pickup sensor 108 includes an active Hall effect sensor. In an alternate embodiment, the pickup sensor 108 includes a passive magnetic pickup. A suitable active sensor and a suitable passive sensor are available from Caterpillar Inc of Peoria, Ill. as part numbers 3E6955 and 5N9292, respectively.

The detecting means 106 also includes a means 110 for filtering the output of the pickup sensor 112. In the preferred embodiment, the filtering means 110 includes an amplifier 112 and a highpass filter 114.

A conditioner/buffer 118 further conditions and prepares the signal for transmission. Such circuit arrangements are well known in the art and are therefore not further discussed. Typically the detecting means 106 including the pickup sensor 108, the filtering means 110 and the condition buffer 118 is located near or about the rotor.

The output signal of the conditioner/buffer circuit 118 is transmitted to a controlling means 122. Typically, the controlling means 122 is designed to control some aspect of a vehicle, for example, a transmission. However, the function of the controlling means 122 is unrelated to the present invention and is therefore not further discussed.

The controlling means 122 includes a Schmitt trigger 120 and a controller 124. Preferably the controller 124 is microprocessor based. A suitable microprocessor is available from Motorola Inc of Schaumburg, Ill. as part number MC68HC11. The Schmitt trigger 120 receives the signal from the conditioner/buffer 118 and triggers an interrupt of the controller 124. Microprocessor interrupts correspond to the detection of rising edges of the teeth (see below). The microprocessor is programmed to mark the time at which each of these interrupts occur and to responsibly determine the speed and direction of rotation.

Figure 4:
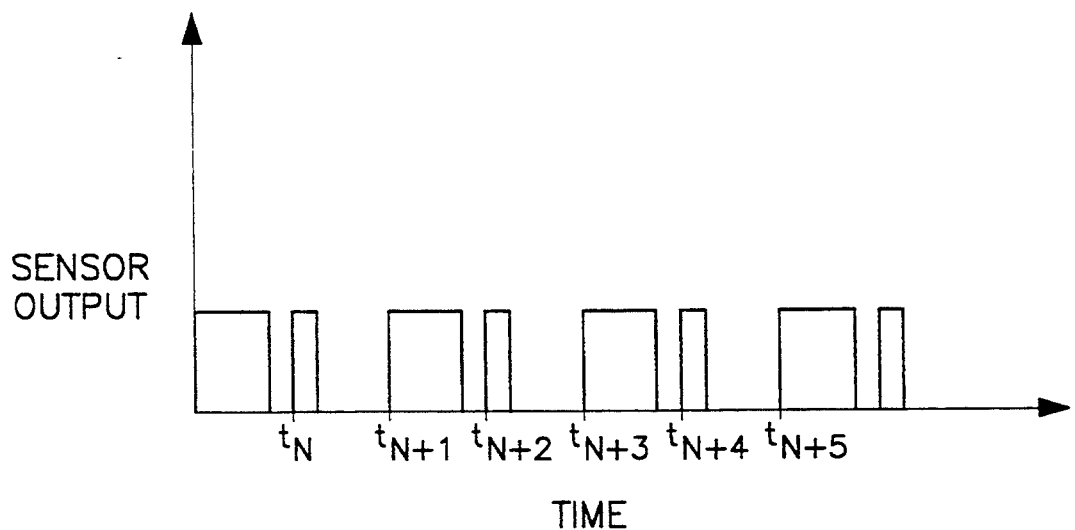
FIG. 4 is an illustration representing the output of the pickup sensor of FIG. 1, when the shaft is rotating in the forward direction.

With reference to FIG. 4, the output of the pickup sensor 108 is illustrated when the shaft 102 is moving in the forward direction (counterclockwise in FIGS. 1 and 2). For illustration purposes pulses in FIG. 4 correspond to the teeth of the sensor. Depending on the sensor, the actual sensor output might be inverted. Analysis, however, remains the same.

For simplicity, the shaft 102 is assumed to be rotating at a constant speed. For illustration purposes, six consecutive rising edges (N, N+1, N+2, N+3, N+4, N+5) will be examined. The times at which these edges are detected are referred to as $t_N$, $t_{N+1}$, $t_{N+2}$, $t_{N+3}$, $t_{N+4}$, and $t_{N+5}$. As can be seen, the time period between each rising edge is the same. That is:

$$t_{N+1} - t_N = t_{N+2} - t_{N+1} = t_{N+3} - t_{N+2} =$$
$$t_{N+4} - t_{N+3} = t_{N+5} - t_{N+4}.$$

Figure 5:
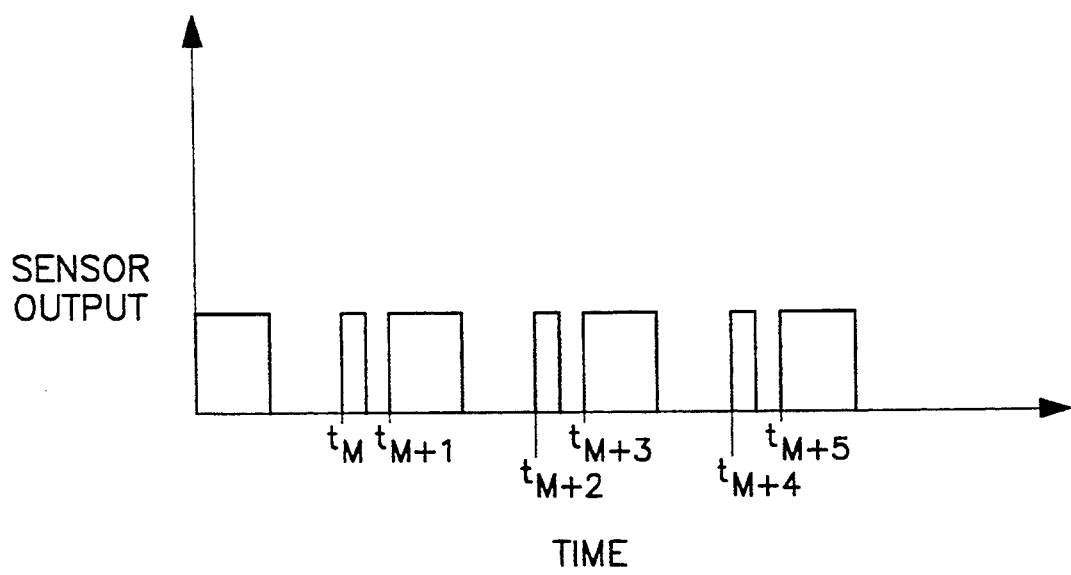
FIG. 5 is an illustration representing the output of the pickup sensor of FIG. 1, when the shaft is rotating in the reverse direction.

With reference to FIG. 5, the output of the pickup sensor 108 is illustrated when the shaft 102 is moving in the reverse direction (clockwise). Again, the shaft is assumed to be rotating at a constant speed. Six rising edges M, M+1, M+2, M+3, M+4 and M+5 will be examined. The times at which these edges are detected are referred to and shown as $t_M$, $t_{M+1}$, $t_{M+2}$, $t_{M+3}$, $t_{M+4}$, and $t_{M+5}$. As can be seen, the time between edges M and M+1 is much less than the time between edges M+1 and M+2. In the preferred embodiment, the time between edges M and M+1 multiplied by the ratio of W1 to W2 (R) is substantially equal to the time between edges M+1 and M+2. This holds true for all subsequent edges. That is, $$(t_{M+1} - t_M)R = t_{M+2} - t_{M+1} = (t_{M+3} - t_{M+2})R =$$
$$t_{M+4} - t_{M+3} = (t_{M+5} - t_{M+4})R.$$

Therefore, by measuring and comparing the time between consecutive edges, the direction in which the shaft is rotating can be detected.

Since the shaft 102 is changing its velocity almost constantly, these relationships will not be exact.

For example, while moving in the forward direction, if the shaft is rotating at a constant speed, then the time between rising edges will be the same. However, changes in velocity will skew, that is, extend or shorten the next edge. This is handled by allowing the forward direction to be determined if consecutive time periods are within some predetermined difference. The predetermined difference is a function of the maximum acceleration of the shaft and the geometry of the rotor.

A similar predetermined difference is allowed for detecting the reverse direction.

The speed of the shaft 102 is determined by noting that the time period between every other edge in both the forward and reverse directions is the same (at a constant speed). For example, referring back to FIG. 4, the time between edges N and N+2 is the same as the time between edges N+2 and N+4. It should also be noted that the same holds true independent on whether the rising edges of the large or small teeth are used. That is, $$t_{N+2} - t_N = t_{N+4} - t_{N+2} = t_{N+5} - t_{N+3} = t_{N+3} - t_{N+1}.$$

The same holds true in the reverse direction: the time between edges M and M+2 and the time between edges M+2 and M+4 are the same. That is:

$$t_{N+2}-t_M = t_{M+4}-t_{M+2} = t_{M+5}-t_{M+3} = t_{M+3}-t_{M+1}.$$

In the preferred embodiment, the controller 124 determines the speed of the shaft 102 by measuring the time interval between a predetermined number of every other rising edges. By dividing the number of edges by the measured time and multiplying by the inverse of one half of the number of total edges on the rotor edges, the speed can be determined.

In another embodiment, the controller 124 determines the speed by counting the number of edges detected in a predetermined period of time.

In still another embodiment, the Schmitt trigger 120 signals the controller 124 when a rising edge has been detected. The controller 124 stores the times at which the edges have been detected in a queue. Periodically or when needed, the controller 124 uses the times stored in the queue to determine the speed and direction of the rotating shaft. For speed determinations, the controller 124 uses the time at which the last edge was detected and every other edge in the queue. That means, that if the last edge detected was the rising edge of a large tooth, then the rising edges of all the large teeth (in the queue) are used. If the last edge was a rising edge from a small tooth, then the speed is determined using the times (in the queue) at which the rising edges of the small teeth were detected.

Figure 6:
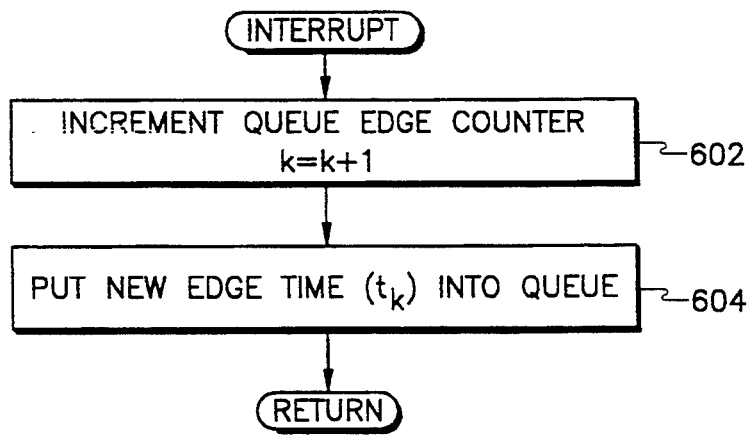
FIG. 6 is a flow diagram of an interrupt routine used in the operation of the sensor, according to an embodiment of the present invention.
Figure 7:
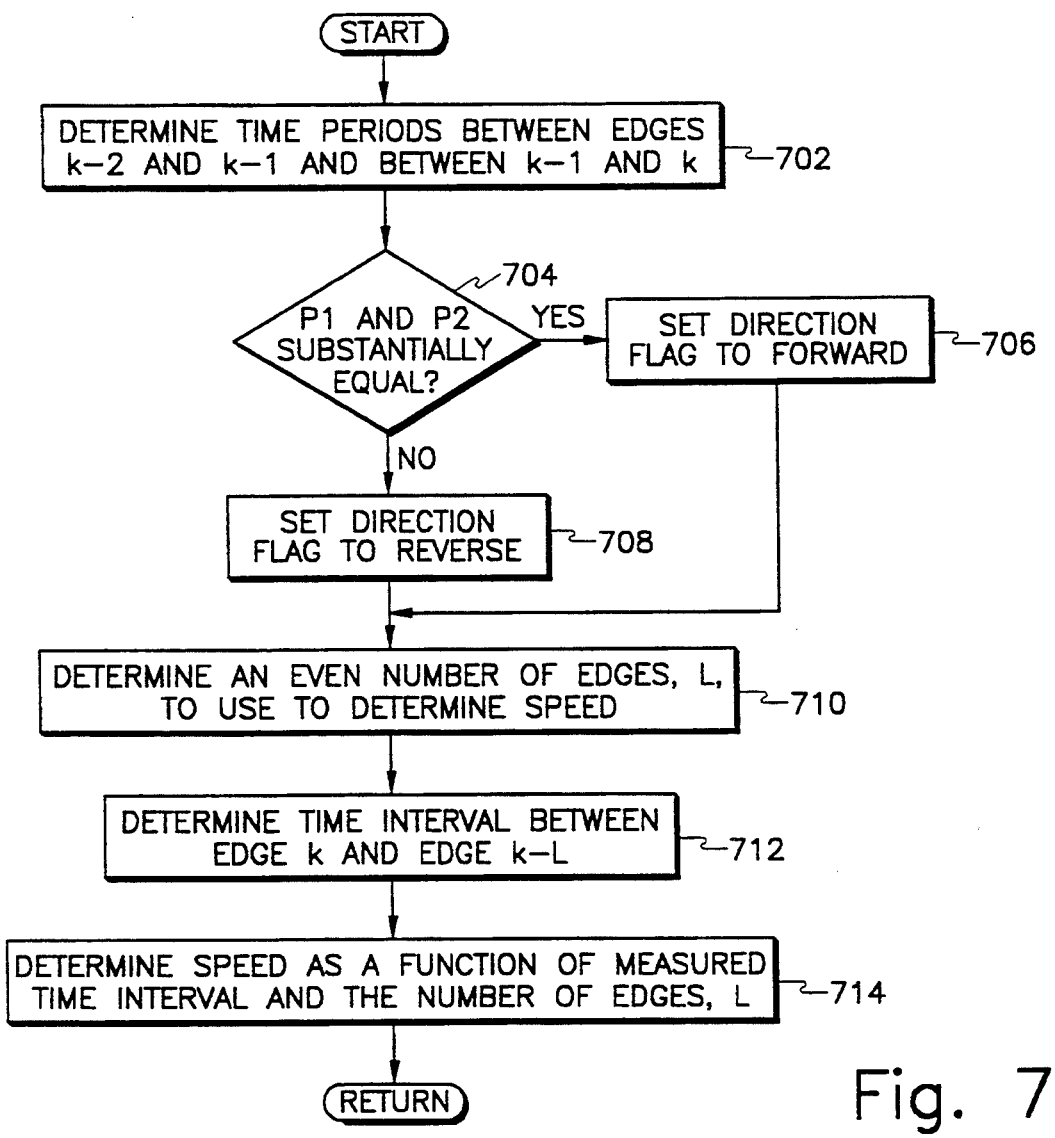
FIG. 7 is a flow diagram of the operation of the sensor, according to an embodiment of the present invention.

With reference to FIGS. 6 and 7, the operation of the apparatus 100 is illustrated.

As discussed above, in the preferred embodiment, the Schmitt trigger 120 causes an interrupt in the microprocessor. The interrupt routine is run every time that a rising edge is detected. In a first control block 602, the controller 124 updates a counter representative of the number of edges (k) stored. In a second control block 604, the controller stores the time at which the current edge was detected in a list or queue. The interrupt routine then returns control to the microprocessor.

As stated above, the speed and direction of the shaft is determined periodically. How often is dependent upon the the needs of the system the sensor is supplying information to. The speed and direction can be determined: at fixed time intervals, every time a new edge is detected, or upon the occurrence of some other event.

In the preferred embodiment, the speed and direction of the shaft are determined as described below. In a third control block 702, the time period between the edges k and k−1 and the time period between edges k−1 and k−2 are determined. That is:

$$P_1 = t_k - t_{k-1} \text{ and}$$

$$P_2 = t_{k-1} - t_{k-2}.$$

In a decision block 704, the time periods, $p_1$ and $p_2$ are compared. If the two time periods are substantially equal then control goes to a fourth control block 706. In the fourth control block 706 a direction flag is set to "FORWARD".

If the two time periods are not substantially equal then control goes to a fifth control block 708. In the fifth control block 708, the direction flag is set to "REVERSE".

In a sixth control block 710 the number of edges (L) to be used in the speed determination is determined. L must always be even and may be: fixed, dependent upon the number of edges in the queue or dependent upon control system requirements.

In a seventh control block 712 the time interval, P, between edges k and k−L is determined:

$$P = t_k - t_{k-L}.$$

In an eighth control block 714, the speed of the shaft is determined as a function of the measured time interval, P, and the number of edges L. Control then exits this routine.

INDUSTRIAL APPLICABILITY

With reference to the drawings and in operation, the present invention or apparatus 100 provides both speed and direction information for a rotating shaft.

As discussed above, due to the unique design of the rotor 104, the present invention provides both speed and direction information with the use of a single pickup sensor.

Furthermore, the apparatus 100 provides a means to accomplish fault detection. For example, when the shaft is being rotated in the reverse direction, the time between each edge should average to a constant value. Any deviation from this constant value may be due to a defect in the rotor, for example, a broken tooth.

Other aspects, objects, and features of the present invention can be obtained from a study of the drawings, the disclosure, and the appended claims.

We claim:

1. An apparatus for determining the speed and direction of a rotating shaft, comprising:

a rotor connected to the shaft and having a plurality of teeth, said plurality of teeth having alternating widths of W1 and W2;

means for detecting the rising edges of said teeth and responsibly producing a signal; and means for receiving said signal and responsibly determining the speed and direction of rotation of the shaft, wherein said speed and direction determining means includes means for determining a first time period between a first rising edge (N) and a second rising edge (N+1) and a second time period between said second rising edge (N+1) and a third rising edge (N+2), comparing said first and second time periods, and wherein the direction of rotation of the shaft is determined as a function of said comparison.

2. An apparatus for determining the speed and direction of a rotating shaft, comprising:

a rotor connected to the shaft and having a plurality of teeth, said plurality of teeth having alternating widths of W1 and W2;

means for detecting the widths of said teeth and responsibly producing respective signals; and means for receiving said respective signals and responsibly determining the direction of rotation of the shaft and for detecting every other of said teeth and responsibly determining the speed of rotation of the shaft.

3. An apparatus, as set forth in claim 2, wherein said speed and direction determining means includes means for counting every other of said teeth in a predetermined time period and wherein the speed of rotation of the shaft is determined as a function thereof.

4. An apparatus, as set forth in claim 2, wherein said speed and direction determining means includes means for counting a predetermined number of every other of said teeth and measuring the time period and wherein the speed of rotation of the shaft is determined as a function thereof.

5. An apparatus for determining the speed and direction of a rotating shaft, comprising:
- a rotor connected to the shaft and having a plurality of teeth, said plurality of teeth having alternating widths of W1 and W2;
- means for detecting said teeth and responsibly producing a signal;
- means for receiving said signal, for detecting rising edges of said first signal, determining a first time period between a first rising edge (N) and a second rising edge (N+1) and a second time period between said second rising edge (N+1) and a third rising edge (N+2), comparing said first and second time periods, and wherein the direction of rotation of the shaft is determined as a function of said comparison, and for detecting every other rising edge and responsibly determining the speed of rotation of the shaft.

* * * * *